(12) United States Patent
Sponheimer et al.

(10) Patent No.: US 7,114,515 B2
(45) Date of Patent: Oct. 3, 2006

(54) IN-LINE VALVE CARTRIDGE

(75) Inventors: Juergen Sponheimer, Klausen (DE); Frank Christ, Bausendorf (DE); Theo Thoennes, Darscheid (DE)

(73) Assignee: American Standard Europe B.V.B.A., Brussels (BE)

( * ) Notice: Subject to any disclaimer, the term of this patent is extended or adjusted under 35 U.S.C. 154(b) by 62 days.

(21) Appl. No.: 11/068,611

(22) Filed: Feb. 28, 2005

(65) Prior Publication Data

US 2006/0191580 A1   Aug. 31, 2006

(51) Int. Cl.
*F16K 11/06*   (2006.01)
(52) U.S. Cl. ............... 137/454.2; 137/625.31
(58) Field of Classification Search ............ 137/454.2, 137/454.6, 625.31; 251/343, 344, 345
See application file for complete search history.

(56) References Cited

U.S. PATENT DOCUMENTS

| | | | | |
|---|---|---|---|---|
| 3,331,396 A | * | 7/1967 | Willis | 137/625.31 |
| 3,426,797 A | * | 2/1969 | Baker | 137/625.31 |
| 4,098,294 A | * | 7/1978 | Woods | 137/614.11 |
| 4,554,948 A | * | 11/1985 | Bergmann | 137/625.31 |
| 4,848,403 A | * | 7/1989 | Pilolla et al. | 137/625.31 |
| 5,025,832 A | * | 6/1991 | Taylor | 137/625.31 |
| 5,025,833 A | * | 6/1991 | Hendrick | 137/625.31 |
| 5,127,438 A | * | 7/1992 | Williams | 137/625.31 |
| 5,365,978 A | * | 11/1994 | Woods | 137/614.11 |
| 6,273,132 B1 | * | 8/2001 | Chrysler et al. | 137/625.31 |
| 6,382,229 B1 | * | 5/2002 | Baker et al. | 137/15.18 |
| 6,575,196 B1 | * | 6/2003 | Creswell | 137/625.46 |
| 6,959,729 B1 | * | 11/2005 | Graber | 137/625.31 |
| 2003/0196712 A1 | | 10/2003 | Graber | |
| 2005/0005977 A1 | | 1/2005 | Bolgar et al. | |

FOREIGN PATENT DOCUMENTS

| | | |
|---|---|---|
| WO | WO 02/14722 | 2/2002 |
| WO | WO 2004/040179 | 5/2004 |

* cited by examiner

*Primary Examiner*—John Fox

(57) ABSTRACT

The present invention provides an in-line valve cartridge for use in sanitary fittings. The valve cartridge of the present invention includes a generally cylindrical housing having a proximate extent for support in a sanitary fitting, a distal extent from which water leaves the cartridge and a longitudinal body extending therebetween. The body has a thickness delineated by inner and outer peripheral surfaces with the inner peripheral surface further defining an elongated lumen thereby. The housing further includes an annular aperture that accommodates placement of a driving member therethrough and includes opposing extents that operate as stops for the driving member and correspond to the valve cartridge's open and closed positions. In addition, rotating and stationary ceramic disks are disposed in tandem wherein the stationary disk has at least one aperture for through flow of cold water, hot water or a combination thereof. At least one protrusion depends outwardly from a portion of the inner peripheral surface adjacent the proximate extent so as to define at least one each of a corresponding proximate seat and a distal seat therein. The proximate and distal seats support an additional valve element in the lumen. A piston is disposed in communication with the driving member such that translational movement of the driving member along the annular aperture imparts rotational motion to the rotating disk, thereby effecting linear fluid flow through the piston and consequently through the cartridge.

14 Claims, 3 Drawing Sheets

IN-LINE VALVE CARTRIDGE

FIELD OF THE INVENTION

The present invention is directed to a valve cartridge for use in sanitary fittings. More particularly, the present invention is directed to a valve cartridge that imparts central flow through capabilities for single or mixed temperature applications. The present invention simultaneously permits integration of the disclosed valve in a plurality of sanitary fitting designs heretofore prohibited by conventional valve cartridge configurations.

BACKGROUND OF THE INVENTION

Sanitary valves are well known in the bath and kitchen industry for the disbursement of water from faucets, showers, handsprays and other sanitary fittings. It is well known to arrange two valve disks adjacent one another in a cartridge casing wherein each disk incorporates one or more apertures to accommodate fluid flow therethrough. One disk remains stationary during operation of the valve with the second disk rotationally disposed relative thereto. A driving element such as a shaft or spindle moves the rotating disk to vary the relative position of the disks, thereby varying the alignment of the apertures and deriving water flow of a desired volume, temperature and pressure. A user discontinues water flow by moving the driving element so that the rotating disk can assume a position that obstructs the apertures of the stationary disk. The disks are desirably fabricated from a ceramic material as is well known in the art.

It is desirable to provide a sanitary valve that achieves central flow through capabilities for single and mixed temperature applications. It is also desirable to provide a sanitary mixing valve that reduces material requirements for optimal sealing and water delivery and that imparts functional capabilities to the cartridge housing. Such a valve can be used in single temperature applications or alternatively used to complement the mixed temperature applications of sanitary mixing valves without altering the cartridge configuration.

SUMMARY OF THE INVENTION

It is an advantage of the present invention to provide an in-line valve cartridge having inherent flow through capabilities for single and mixed temperature applications. In this configuration, the in-line valve cartridge of the present invention is successfully employed in a plurality of sanitary installations, including but not limited to kitchen and bath faucets, showers, bath fittings, handsprays and complementary devices.

It is another advantage of the present invention to provide an in-line valve cartridge that incorporates frictional fit of an inlet seal and a seal adjacent a stationary disk in the housing such that the relative frictional fit between the seal and the stationary disk to one another, in combination with the operation of stationary and rotating disks, achieves integration of the seals without welding and without the insertion of additional seals such as O-rings to impute pressure on the stationary disk. In this configuration, the inlet seal and stationary disk seal are functionally integral with the housing yet detachably inserted into complementary grooves in the housing for easy assembly and maintenance.

In accordance with these and other advantages, the present invention is directed to a valve cartridge for use in sanitary fittings. The valve cartridge of the present invention includes a generally cylindrical housing having a proximate extent for support in a sanitary fitting, a distal extent from which water leaves the cartridge and a longitudinal body extending therebetween. The body has a thickness delineated by inner and outer peripheral surfaces with the inner peripheral surface further defining an elongated lumen thereby. The housing further includes an annular aperture that accommodates placement of a driving member therethrough and includes opposing extents that operate as stops for the driving member and correspond to the valve cartridge's open and closed positions. In addition, rotating and stationary ceramic disks are disposed in tandem wherein the stationary disk has at least one aperture for through flow of cold water, hot water or a combination thereof. At least one protrusion depends outwardly from a portion of the inner peripheral surface adjacent the proximate extent so as to define at least one each of a corresponding proximate seat and a distal seat therein. The proximate and distal seats support an additional valve element in the lumen. A piston is disposed in communication with the driving member such that translational movement of the driving member along the annular aperture imparts rotational motion to the rotating disk, thereby effecting linear fluid flow through the piston and consequently through the cartridge.

The present invention valve cartridge desirably includes an elastomeric inlet seal disposed adjacent the proximate extent of the housing to facilitate mounting of the cartridge to a support surface. The stationary disk and said rotating disk are placed in tandem adjacent a second elastomeric seal that is frictionally secured by the at least one distal seat such that the second seal and at least one distal seat together secure the stationary disk within the housing. The second seal includes at least one aperture therethrough corresponding to the apertures of the stationary disk.

The piston desirably includes at least one groove circumferentially defined therearound that accommodate placements of at least one corresponding O-ring therewithin. The piston may also include an aperture for securement of the driving member therewithin.

In the alternative, a centric spindle in communication with the driving member may be employed instead of a piston. Such centric spindle allows water to flow therearound and along the inner peripheral surface of the body for egress therefrom.

The in-line valve cartridge of the present invention reduces the complexity and material waste associated with conventional valve cartridge designs. This benefit inures to the simplicity of sanitary installations by enabling use of identical valves in multiple sanitary applications with varying aesthetic appearances. The present invention enhances the structural and aesthetic selection of sanitary designs by achieving designs heretofore incapable of use due to the constraints of conventional mixing valve design. The present invention performs this accomplishment and simultaneously permits easy installation, use and maintenance in both single and mixed temperature applications. This improved mixing valve therefore enables superior flow through water delivery in a simple configuration that has applications not only for faucets but also for bath and shower fittings and other water delivery applications.

DETAILED DESCRIPTION OF THE INVENTION

Figure 1:
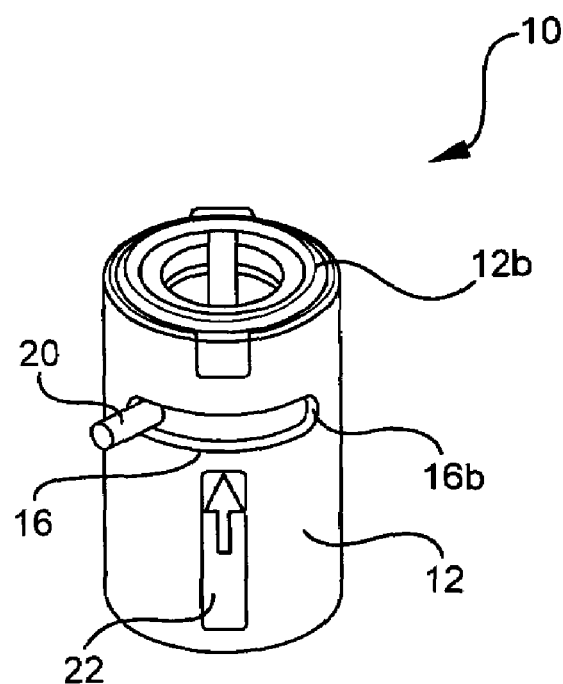
FIG. 1 is a perspective view of an in-live valve cartridge of the present invention.
Figure 2:
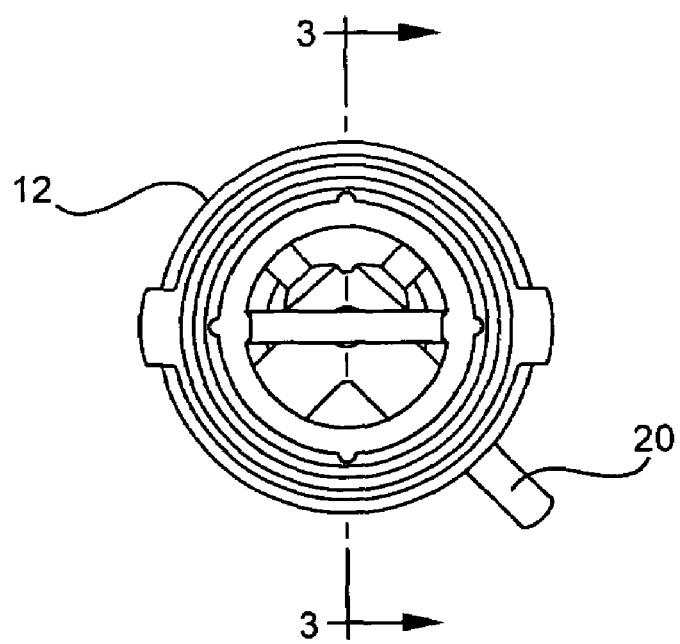
FIG. 2 is a top view of the in-line valve cartridge of FIG. 1.

Now referring to the figures, in which like elements have identical reference numbers, an in-line valve cartridge 10 of the present invention is shown. Specifically referring to FIGS. 1 and 5, cartridge 10 includes a generally cylindrical housing 12 having a proximate extent 12a for support within a housing of a sanitary fitting within which cartridge 12 is disposed, a distal extent 12b from which water leaves cartridge 12 and a longitudinal body 14 extending therebetween. Body 14 has a thickness delineated by an outer peripheral surface and an inner peripheral surface, which inner peripheral surface further defines elongated lumen 18 within body 14. A portion of the inner peripheral surface adjacent proximate extent 12a has protrusions 19 depending outwardly therefrom and defining proximate seats 19a and distal seats 19b therein. Seats 19a and 19b support additional valve element in lumen 18 as described further hereinbelow.

Housing 12 further includes an annular aperture 16 that connects the outer and inner peripheral surfaces of body 14 and accommodates placement of a driving member 20 therethrough. Driving member 20 rotates about the longitudinal axis of housing 12 (coinciding with line A—A shown in FIG. 1) and correspondingly achieves translational movement through aperture 16. Aperture 16 has opposing extents 16a and 16b that operate as stops for driving member 20 and help define the open and closed positions of cartridge 10, as described below Body 14 may also have one or more indicia 22 defined thereon to indicate proper positioning of cartridge 10 in the sanitary fitting and thus also the direction of fluid flow therethrough. An elastomeric inlet seal 24 is disposed adjacent proximate extent 12a of housing 12 to facilitate mounting of cartridge 10 to a support surface and thereby prevent fluid leaks at the mounting connection. Proximate seats 19a accommodate satisfactory frictional securement of inlet seal 24 therewithin, although additional securement options such as epoxies and adhesives may also be used in combination therewith.

Figure 3:
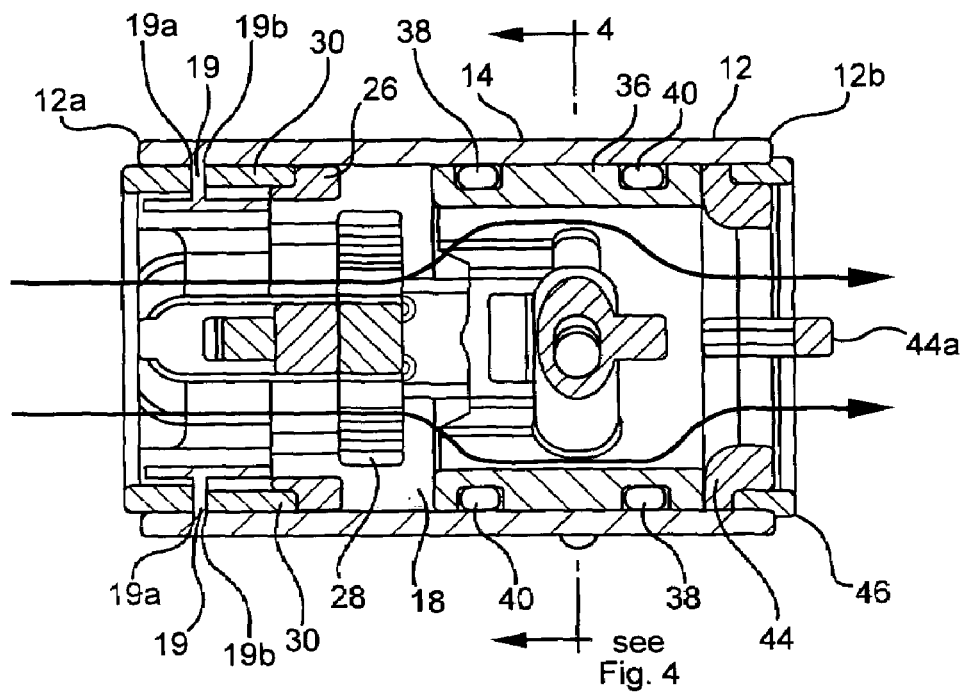
FIG. 3 is a sectional view of the in-line valve cartridge along line A—A shown in FIG. 2.
Figure 5:
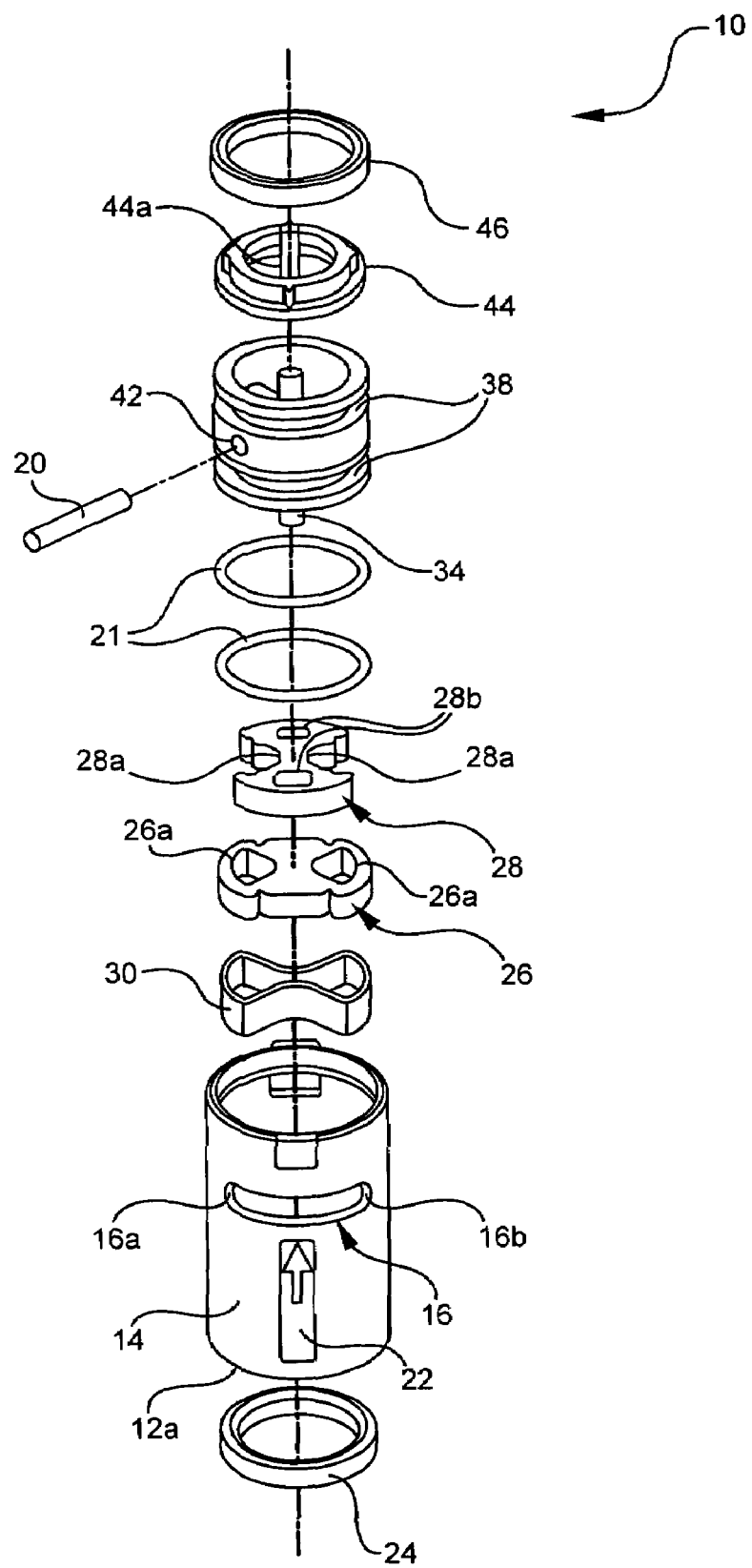
FIG. 5 is an exploded view of the in-line valve cartridge of the present invention.

Referring to FIGS. 3 and 5, each of a stationary ceramic disk 26 and a rotating disk 28 are placed in tandem adjacent a second elastomeric seal 30 that is frictionally secured by distal seats 19b. Stationary disk 26 includes at least one aperture 26a that facilitates through flow of cold water, hot water or a combination thereof. Seal 30 desirably includes at least one complementary aperture therethrough (not shown) corresponding to apertures 26a. Seal 30 and distal seats 19b together secure stationary disk 26 within housing 12 such that stationary disk 26 and seal 30 are functionally integral with the housing yet detachably inserted into complementary grooves in the housing for easy assembly and maintenance. This relative frictional fit achieves integration of seals without welding and without the insertion of additional seals such as O-rings that are used in conventional mixing valves, thereby eliminating undesirable pressure on the stationary disk.

Rotating disk 28 is rotationally disposed relative to stationary disk 26 and includes one or more cut-outs 28a defined therethrough and one or more recesses 28b defined on a distal surface thereof. Cut-outs 28a may assume any geometry that is conducive to the successful operation of cartridge 10. Recesses 28b engage corresponding protrusions 34 that depend downwardly from a proximate extent of a piston 36 such that translational movement of driving member 20 causes rotation of rotating disk 28. In the alternative, a centric spindle may be used in place of piston 36 that allows water to flow therearound and along the inner peripheral surface of body 14 to the water outlet.

Piston 36 includes grooves 38 circumferentially defined therearound that accommodate placement of corresponding O-rings 40 therewithin. Piston 36 also includes aperture 42 for securement of driving member 20 therewithin. Adjacent a distal extent of piston 36, an axial bearing 44 and an elastomeric seal 46 are disposed to facilitate employment of the cartridge 10 in a sanitary fitting. Axial bearing 44 desirably includes a bended rib 44a formed across a radial span thereof. Rib 44a facilitates gripping with pliers or one or more digits for easy disassembly and maintenance of cartridge 10.

Figure 4:
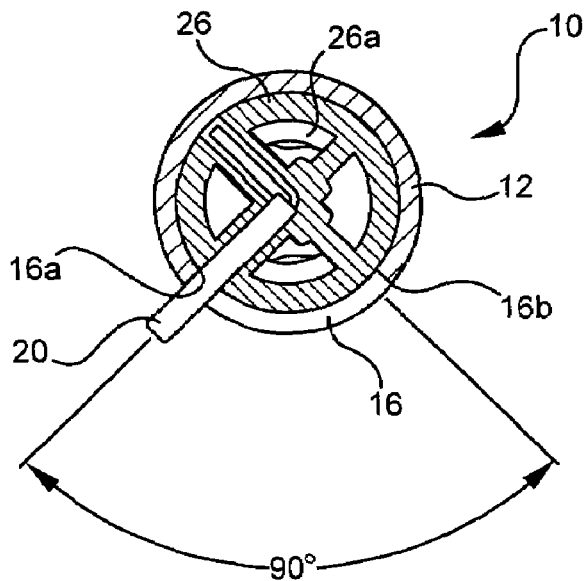
FIG. 4 is a sectional view of the in-line valve cartridge along line B—B shown in FIG. 3.

In use, cartridge 10 is fixed within an existing sanitary fitting via a plurality of fastening members that are well known in the industry. A user imparts translational movement to driving member 20 through aperture 16, thereby rotating driving member 20 about the longitudinal axis of housing 12. Since recesses 28b readily engage protrusions 34, such translational movement causes rotating disk 28 to revolve. Continuing rotation of rotating disk 28 via translational movement of driving member 20 moves cut-outs 28a relative to apertures 26a of stationary disk 26, thereby adjusting the volume of fluid flow through cartridge 10. The presence of multiple apertures enables any of hot water, cold water or mixed temperature water to flow directly through the center of piston 36 in the path shown in FIG. 3 (in the case of mixed temperature applications, a mixing valve is disposed adjacent cartridge 10, which mixing valve is selected from a plurality of mixing valves that are well known in the art and may form part of the preexisting sanitary fitting). The extent of the driving member's movement in aperture 16 is about 90° (as shown in FIG. 4). The user is therefore certain when the valve is fully opened or fully closed without requiring additional stop members in the valve construction.

The present invention benefits multiple sanitary applications in that the same valve cartridge may be employed in a single installation having multiple fittings (for example, a faucet, a shower and a handspray). This valve configuration advantageously simplifies the construction of sanitary installations and simultaneously attenuates concerns about performance and temporal and fiscal costs inherent in the installation and maintenance of multiple valve configurations. In addition, the present invention achieves flow through performance in a variety of sanitary fitting designs, thereby permitting selection of a broader range of aesthetic options without compromising the flow through function of the valve. Unlike conventional mixing valves, the present invention accomplishes flow through performance in combination with the relative frictional fit between the seal and the stationary disk, thereby utilizing fully the functional capabilities of the cartridge housing.

Various changes to the foregoing described and shown structures are now evident to those skilled in the art. The matter set forth in the foregoing description and accompanying drawings is therefore offered by way of illustration only and not as a limitation. Accordingly, the particularly disclosed scope of the invention is set forth in the following claims.

What is claimed is:

1. A valve cartridge for use in sanitary fittings, comprising:
 a generally cylindrical housing having a proximate extent for support within a housing of a sanitary fitting within which said cartridge is disposed, a distal extent from which water leaves said cartridge and a longitudinal body extending therebetween, said body having a thickness delineated by an outer peripheral surface and an inner peripheral surface, said inner peripheral surface further defining an elongated lumen within said body; said housing further including an annular aperture that connects said outer and inner peripheral surfaces of said body and accommodates placement of a driving member therethrough, said driving member rotating about a longitudinal axis of said housing and correspondingly achieving translational movement through said aperture, said aperture having opposing extents that operate as stops for said driving member and define open and closed positions of said valve cartridge;
 a rotating disk rotationally disposed relative to a stationary disk wherein said stationary disk has at least one aperture for through flow of cold water, hot water or a combination thereof; and
 at least one protrusion depending outwardly from a portion of said inner peripheral surface adjacent said proximate extent so as to define at least one each of a corresponding proximate seat and a distal seat therein, said proximate and distal seats supporting an additional valve element in said lumen.

2. The valve cartridge of claim 1, further including an elastomeric inlet seal disposed adjacent said proximate extent of said housing to facilitate mounting of said cartridge to a support surface.

3. The valve cartridge of claim 2, wherein said stationary disk and said rotating disk are placed in tandem adjacent a second elastomeric seal that is frictionally secured by said at least one distal seat such that said second seal and said at least one distal seat together secure said stationary disk within said housing.

4. The valve cartridge of claim 3, wherein said second seal includes at least one aperture therethrough corresponding to said apertures of said stationary disk.

5. The valve cartridge of claim 1, further including a piston in communication with said driving member such that translational movement of said driving member imparts rotational motion to said rotating disk to effect linear fluid flow through said piston.

6. The valve cartridge of claim 5, wherein said stationary disk includes one or more recesses defined on a distal surface thereof.

7. The valve cartridge of claim 6, wherein said one or more recesses correspondingly engage said at least one protrusion of said piston to effect said rotational movement of said rotating disk.

8. The valve cartridge of claim 5, wherein said piston includes at least one groove circumferentially defined therearound that accommodate placements of at least one corresponding O-ring therewithin.

9. The valve cartridge of claim 5, wherein said piston includes an aperture for securement of said driving member.

10. The valve cartridge of claim 5, further including an axial bearing adjacent said distal extent of said piston.

11. The valve cartridge of claim 10, wherein said axial bearing includes at least one bended rib formed across a radial span thereof so as to facilitate gripping of said valve cartridge.

12. The valve cartridge of claim 10, further including a third elastomeric seal adjacent said axial bearing to facilitate employment of said valve cartridge in a sanitary fitting.

13. The valve cartridge of claim 1, further includes a centric spindle in communication with said driving member, said centric spindle allowing water to flow therearound and along said inner peripheral surface of said body for egress therefrom.

14. The valve cartridge of claim 1, wherein said body includes one or more indicia defined thereon to indicate proper positioning of said cartridge in said sanitary fitting and thus also the direction of fluid flow therethrough.

* * * * *